United States Patent

Cone, II

[11] Patent Number: 5,533,786
[45] Date of Patent: Jul. 9, 1996

[54] CHILD RESTRAINT APPARATUS FOR A CHILD SEAT

[75] Inventor: Richard E. Cone, II, Athens, Ohio

[73] Assignee: Cosco, Inc., Columbus, Ind.

[21] Appl. No.: 334,750

[22] Filed: Nov. 4, 1994

[51] Int. Cl.$^6$ ........................................ B60N 2/26
[52] U.S. Cl. .................. 297/256.15; 297/487; 297/463.1
[58] Field of Search ................................ 297/467, 464, 297/487, 488, 250.1, 256.15, 463.1

[56] References Cited

U.S. PATENT DOCUMENTS

| | | | |
|---|---|---|---|
| 2,851,084 | 9/1958 | Benjetsky | 297/467 X |
| 2,955,296 | 10/1960 | Zapolski | 297/250.1 X |
| 3,761,126 | 9/1973 | Mulholland | 297/467 |
| 4,545,613 | 10/1985 | Martel et al. | 297/250 |
| 4,634,185 | 1/1987 | Kassai | 297/487 |
| 4,662,683 | 5/1987 | Knoedler et al. | 297/488 |
| 4,998,307 | 3/1991 | Cone | 5/94 |
| 5,061,012 | 10/1991 | Parker et al. | 297/467 |
| 5,092,004 | 3/1992 | Cone et al. | 5/94 |
| 5,115,523 | 5/1992 | Cone | 5/94 |
| 5,286,086 | 2/1994 | Gunji | 297/250.1 |
| 5,317,765 | 6/1994 | Knoedler et al. | 297/467 X |
| 5,320,416 | 6/1994 | Kornberg | 297/467 |
| 5,326,327 | 7/1994 | Stephens et al. | 472/119 |
| 5,334,099 | 8/1994 | Marra et al. | 297/467 X |

*Primary Examiner*—Milton Nelson, Jr.
*Attorney, Agent, or Firm*—Barnes & Thornburg

[57] ABSTRACT

A child seat having a child restraint apparatus is provided. The child seat includes a shell formed to include a seat bottom having a front edge and a back edge. The child seat also includes a T-shaped bar including a post having a base mounted to the shell and a tip. The T-shaped bar also includes an elongated transverse cross member appended to the tip and arranged to lie in perpendicular relation to the post. The cross member swings between a child-restraining position above the seat bottom and a down-out-of-the-way position below the seat bottom. The base is mounted to pivot about a pivot axis and the cross member is spaced-apart from the pivot axis to overlie legs of a child seated on the seat bottom when the cross member is in the child-restraining position. The child seat further includes a foot rest and a mechanism for supporting the foot rest below the seat bottom so that the cross member engages the foot rest to limit further downward pivoting movement when the cross member is in the down-out-of-the-way position.

61 Claims, 4 Drawing Sheets

FIG. 6

CHILD RESTRAINT APPARATUS FOR A CHILD SEAT

BACKGROUND AND SUMMARY OF THE INVENTION

The present invention relates to a child restraint apparatus, and particularly to a child restraint apparatus for a child seat. More particularly, the present invention relates to a child restraint apparatus that lies between the child and a front edge of the child seat in a position opposing the seat backrest to prevent the child from inadvertently sliding off of the front edge of the child seat.

Child restraint systems are widely accepted as useful for helping young children to remain seated in child seats. Child seats having restraint systems are well known in the art. For example, U.S. Pat. No. 5,326,327 to Stephens et al., U.S. Pat. Nos. 5,115,523 and 4,998,307 to Cone, U.S. Pat. No. 5,092,004 to Cone et al., U.S. Pat. No. 4,662,683 to Knoedler et al., and U.S. Pat. No. 4,545,613 to Martel et al. all disclose child seats having restraint systems.

What is needed is a child seat having a seat bottom and a child restraint apparatus that swings easily from an upright child-restraining position above the seat bottom to an unobtrusive down-out-of-the-way position below the seat bottom. Ideally, such a child restraint apparatus would be easy to make and install in a wide variety of child seats.

According to the present invention, a child seat having a child restraint apparatus is provided. The child seat includes a shell having a seat bottom with a front edge, a back edge, and a seat back extending upwardly from the back edge of the seat bottom. The child seat further includes a rotatable restraint bar that is usable to restrain a child seated in the shell. The restraint bar includes a post having a base and a tip. The base of the post is mounted for rotation to the shell and arranged so that the tip swings easily along an arc between a down-out-of-the-way position below the seat bottom and a child-restraining position above the seat bottom.

Illustratively, a rotatable restraint bar in accordance with the present invention is mounted to lie adjacent to a seat bottom included in a high chair. It is within the scope of the present invention to include such a rotatable restraint bar in a wide variety of child-supporting units such as car seats, child swings, car beds, child carriers, strollers, and other types of child seats.

In preferred embodiments, a foot rest having a convex exterior surface is appended to a lower portion of the shell and arranged to extend below the front edge of the seat bottom. Illustratively, the restraint bar is T-shaped and includes a transverse cross member appended to the tip of the rotatable post. The transverse cross member is configured to provide additional restraint when the restraint bar is in the child-restraining position. Preferably, the transverse cross member is curved about its longitudinal axis to define an elongated foot rest-engaging channel and the foot rest nests in the channel when the post is in the down-out-of-the-way position below the seat bottom.

Ideally, the T-shaped restraint bar is rotatably mounted to a center portion of the front edge of the seat bottom in spaced-apart relation to each of the seat arm side walls included in the shell. When rotated to its upright child-restraining position, the T-shaped restraint bar passes easily between the legs of a child seated on the seat bottom in the shell. Upon arrival at its upright child-restraining position, the post of the T-shaped restraint bar will lie near the crotch of the seated child and the transverse cross member appended to the tip of the post will lie near the abdomen of the seated child. Conveniently, the T-shaped restraint bar does not obstruct removal of a child from the child seat by a care giver after the T-shaped restraint bar has been rotated to its down-out-of-the-way position engaging the foot rest underlying the seat bottom.

A locking mechanism is provided for locking the restraint bar in its upright child-restraining position so that the restraint bar is fixed to the shell to provide a rigid child-restraining safety shield at the front edge of the seat bottom. The locking mechanism is mounted inside the post. Illustratively, the locking mechanism is spring-loaded and is arranged to lock the restraint bar to the shell automatically as soon as the restraint bar is swung upwardly by a care giver to reach the upright child-restraining position.

A lock-release button is mounted on a convenient place on the post so that it can be operated easily by a care giver with one hand. The lock-release button is linked to the locking mechanism mounted in the post. When activated by a care giver, the button moves to actuate the spring-loaded locking mechanism to release the T-shaped restraint bar from its locked connection to the shell to allow the T-shaped restraint bar to swing easily into the down-out-of-the-way position lying below the seat bottom and engaging the foot rest.

To restrain a child in the child seat, a care-giver simply seats the child in the shell on the seat bottom and swings the restraint bar from a down-out-of-the-way position below the child seat to a child-restraining position above the seat bottom in front and between the legs of the child. Once the restraint bar reaches the child-restraining position, the restraint bar is automatically locked into place by a spring-loaded locking mechanism and will swing no further in either direction.

Releasing the child requires only that the care giver press the release button deactivating the spring-loaded locking mechanism and unlocking the post from the shell. The care giver then simply swings the rotatable post from the child-restraining position above the seat bottom to the down-out-of-the-way position below the seat bottom, thereby gaining free and unrestricted access to the child seated in the shell. The transverse cross member of the restraint bar rests against the foot rest when the restraint bar is in the down-out-of-the-way position. The foot rest fits in the elongated foot-rest receiving channel to prevent unwanted movement of the restraint bar when seating or removing the child from the child seat.

When the child restraint apparatus of the present invention is in the down-out-of-the-way position, it provides the same degree of unrestricted access to the child seat that would be available if there were no restraint apparatus at all. The transverse cross member provides an additional restriction when the child is restrained in the child seat, and when the T-shaped restraint bar is in the down-out-of-the-way position the transverse cross member lies essentially flush with the portion of the shell forming the foot rest, maximizing the ease of accessing the seat.

Advantageously, the child restraint includes a restraint bar that swings easily relative to a seat bottom in a shell between a down-out-of-the-way position and a child-restraining position. The post is retained in its upright child-restraining position by means of a spring-loaded locking mechanism coupling the post to the shell. The restraint bar includes a convenient release button that is easy to operate with one hand to control unlocking of the spring-loaded locking mechanism and a cross member on the post that rests against a foot rest attached to the child seat when the restraint bar is in its down-out-of-the-way position. This child-restraint apparatus is well-suited for use in high chairs and other infant, child, or youth seats such as strollers, infant carriers, car seats, car beds, child swings, and the like.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2:
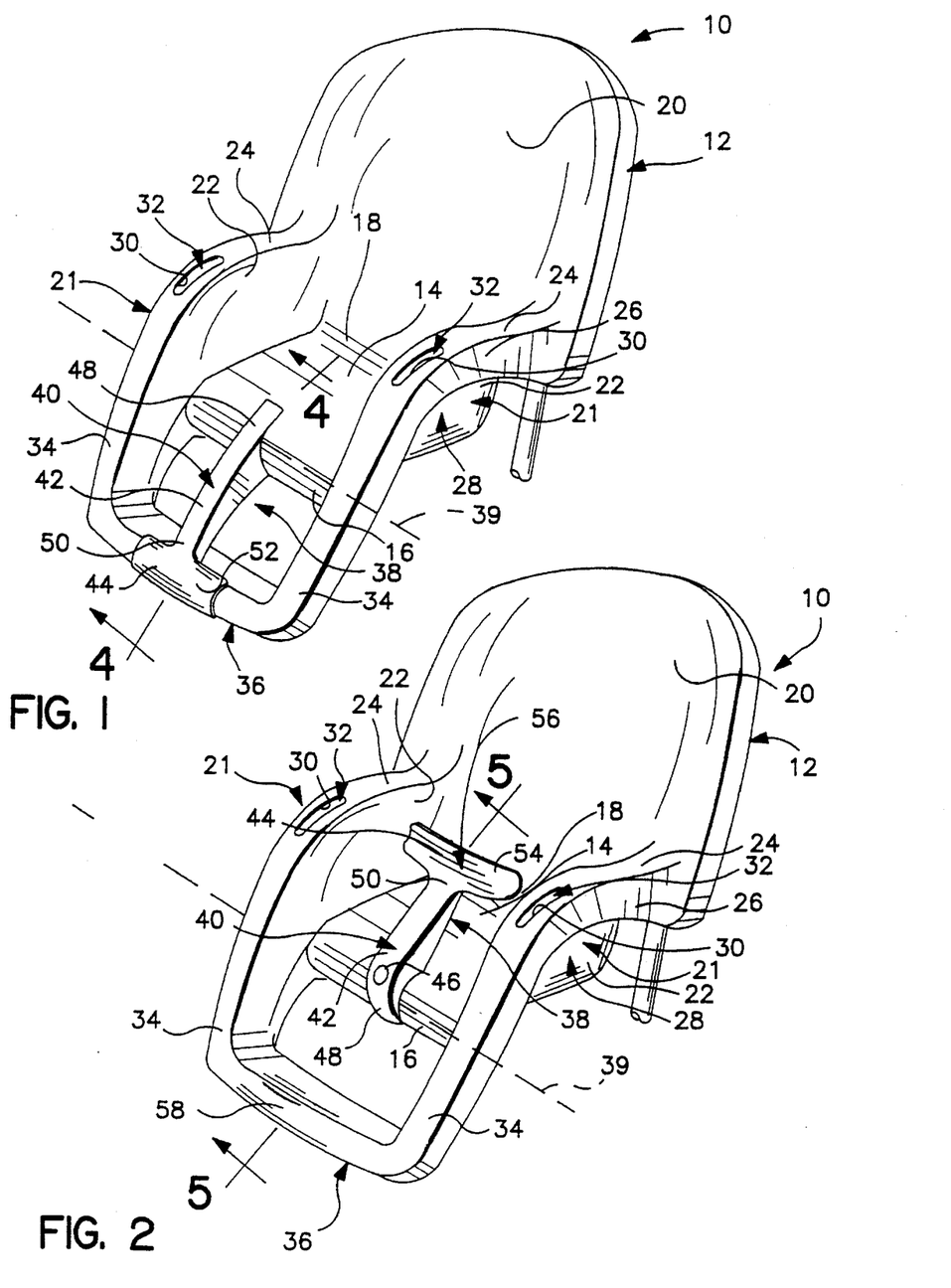
FIG. 1 is a perspective view of a child seat having a child restraint apparatus in accordance with the present invention after a side arm-mounted high chair tray has been removed showing a T-shaped restraint bar having a post pivotably mounted on a front edge of a seat bottom in the child seat and moved to a down-out-of-the-way position below the seat bottom so that a cross member included in the T-shaped restraint bar is mated against a foot rest provided below the seat bottom.
FIG. 2 is a view similar to FIG. 1 showing the T-shaped restraint bar locked to remain in an upright child-restraining position above the seat bottom so as to expose a post-unlocking release button mounted in the post and arranged to protrude from a now forward-facing surface of the post.

An illustration of a child restraint apparatus 38 for a child seat is shown in FIGS. 1 and 2. The child seat 10 includes a shell 12 formed to include a seat bottom 14 having a front edge 16 and a back edge 18, a seat back 20 appended to the back edge 18 of the seat bottom 14 and extending upwardly therefrom, and two spaced-apart side arms 21 situated to lie on opposite sides of the seat bottom 14 and extending upwardly therefrom.

Each side arm 21 includes an inner side wall 22, a top wall 24 appended to a top edge of the inner side wall 22, and an outer side wall 26 appended to the top wall 24. The inner and outer side walls 22, 26 and the top wall 24 in each side arm 21 cooperate to define a downwardly opening U-shaped channel 28 as shown in FIGS. 1 and 2. Two additional side walls 30 are appended to the top wall 24 and are arranged to define tray-receiving slots 32 in top wall 24. A tray (not shown) can be mounted on side arms 21 in a position overlying seat bottom 14 using tray-receiving slots 32.

Two downwardly extending foot rest-support legs 34 are appended to the side arms 21 of the shell 12 adjacent to the front edge 16 as shown in FIGS. 1 and 2. A foot rest 36 is appended to the foot rest-support legs 34 and is arranged to extend in front of and below the seat bottom 14. Illustratively, shell 12 is a unitary piece made of plastics material and formed to include seat bottom 14, seat back 20, side arms 21, foot rest-support legs 34, and foot rest 36.

A child restraint apparatus 38 is mounted for rotation to the child seat 10. The child restraint apparatus 38 swings between a use position and a stored position. In the use position, the child restraint apparatus 38 lies adjacent to the front edge 16 of the seat bottom 14. In this position, the child restraint apparatus 38 blocks movement of a child (not shown) seated on the seat bottom 14 in a direction away from the seat back 20 and past the front edge 16 of the seat bottom 14.

When the child restraint apparatus is in the stored position, the child restraint apparatus 38 lies away from the front edge 16 of the seat bottom 14. Moving a child (not shown) onto the seat bottom 14 while the child restraint apparatus 38 is in the use position would require lifting the child over the child restraint apparatus 38 and then sliding the child downwardly against the seat back 20 and onto the seat bottom 14. In contrast, moving the child onto the seat bottom while the child restraint apparatus 38 is in the stored position allows the child to be placed on the front edge 16 of the seat bottom 14 and slid into position against the seat back 20. When in the stored positon, the child restraint apparatus allows unimpeded movement of a child moving onto the seat bottom 14 and engaging the front edge 16 of the seat bottom 14.

Figure 3:
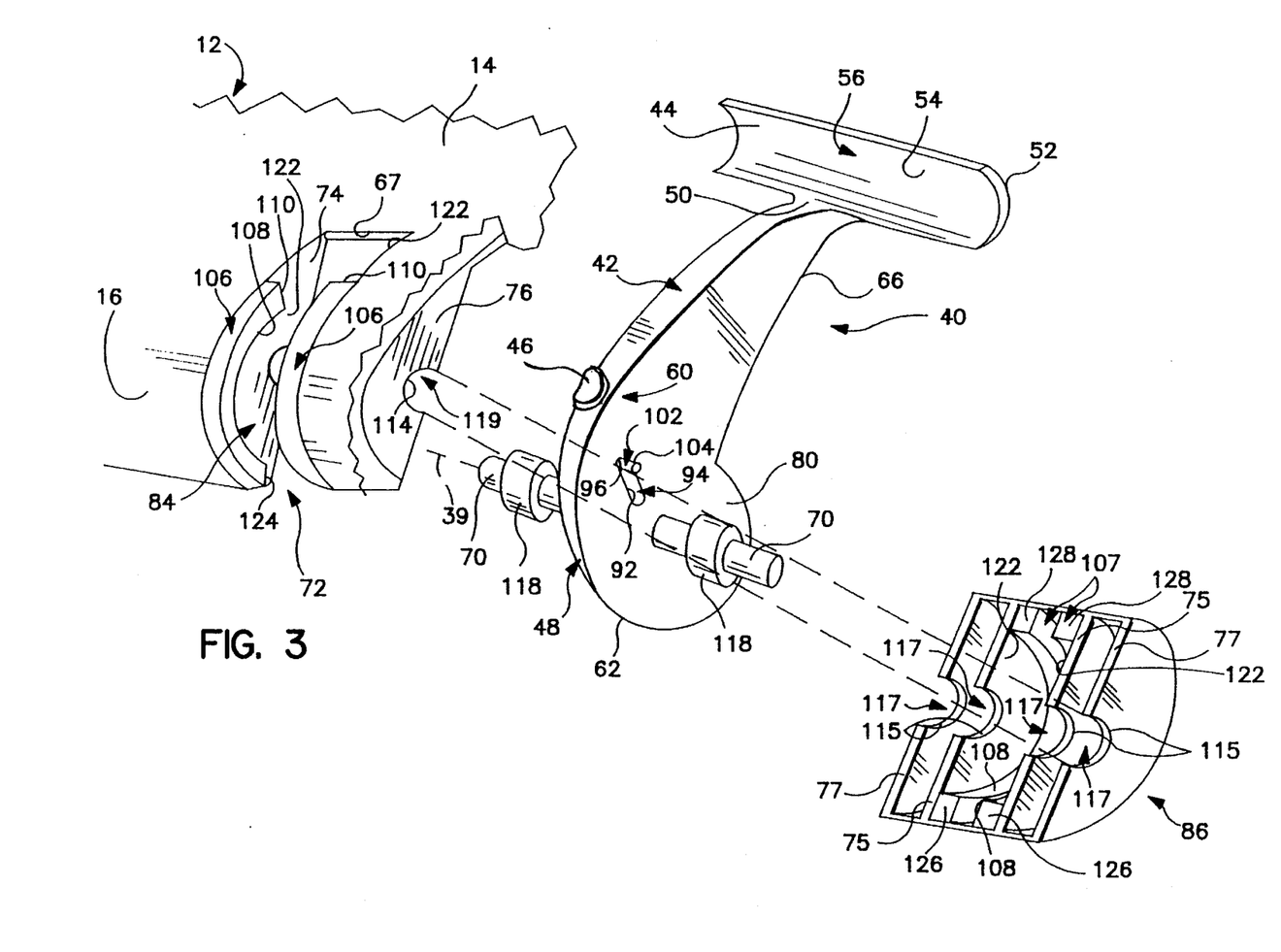
FIG. 3 is an exploded view of a portion of the front edge of the child seat and the child restraint apparatus of FIGS. 1 and 2 showing a mount appended to the front edge of the child seat for rotatably mounting the T-shaped restraint bar, a cover for holding the T-shaped restraint bar against the mount, the post-unlocking release button mounted in the base of the post, and an axle mounted to the base of the post.

The child restraint apparatus 38 is mounted for rotation to a front edge 16 of the seat bottom 14 as shown in FIGS. 1, 2, and 3. The child restraint apparatus 38 can be rotated about axis of rotation 39 to assume either a down-out-of-the-way position below the seat bottom 14 as shown in FIG. 1 or an upright child-restraining position above the seat bottom 14 as shown in FIG. 2.

The rotatable child restraint apparatus 38 includes a T-shaped restraint bar 40 having a post 42 and an elongated transverse cross member 44 appended to the post 42. The transverse cross member 44 is curved about its longitudinal axis and arranged to lie in perpendicular relation to the post 42 as shown, for example, in FIGS. 2 and 3, so that it has a shape that resembles a snow shovel. The post 42 includes a distal tip 50 and a base 48 rotatably mounted to the front edge 16 of the seat bottom as shown in FIGS. 1 and 2.

Figures 4, 5:
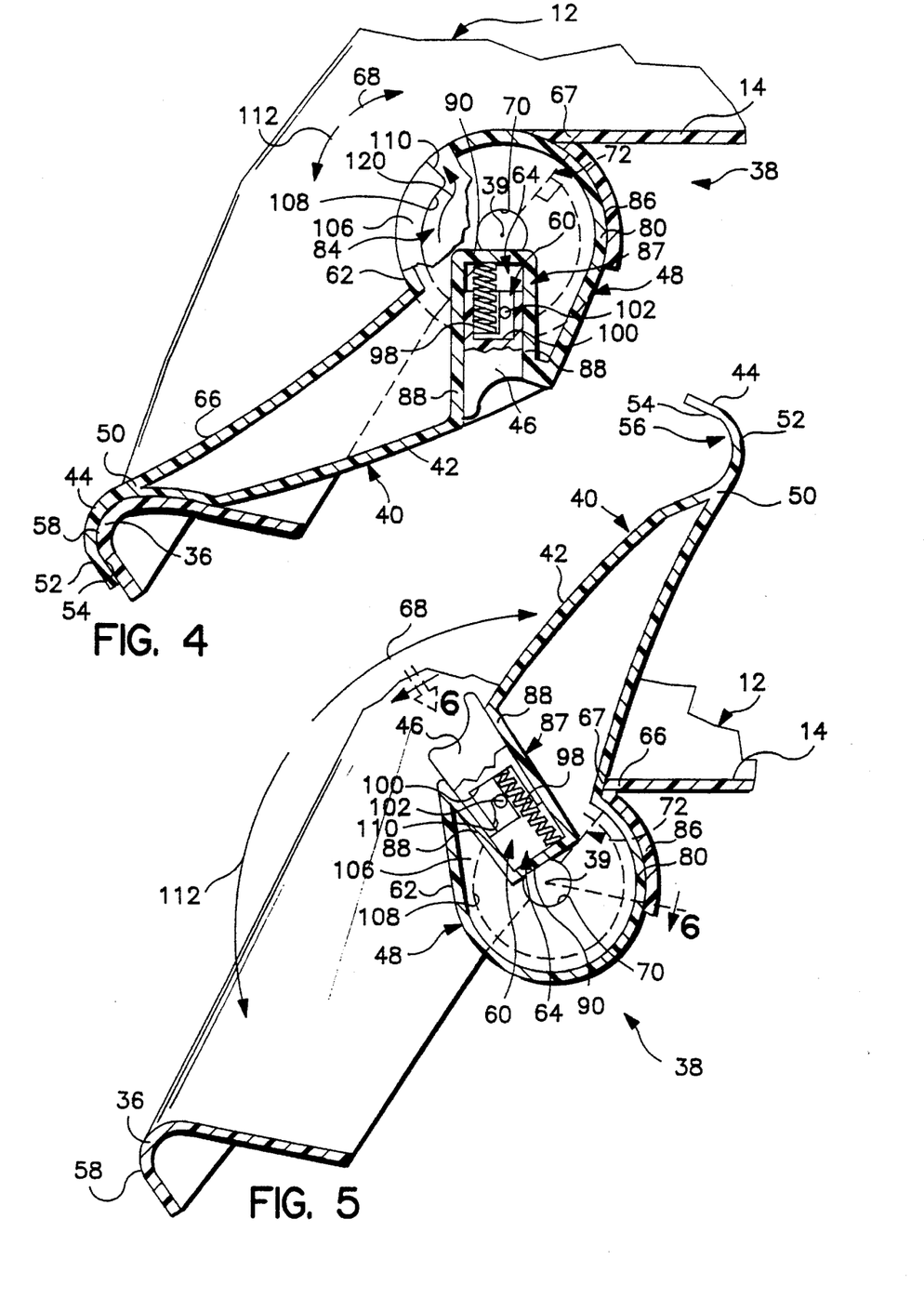
FIG. 4 is a sectional view taken along line 4—4 of FIG. 1 showing a locking mechanism for the T-shaped restraint bar, the T-shaped restraint bar lying in the down-out-of-the-way position, the cross member engaging the foot rest, and a downwardly-opening chamber lying in the base and containing the post-unlocking release button.
FIG. 5 is a sectional view taken along line 5—5 of FIG. 2 showing the T-shaped restraint bar after it has been swung to the upright child-restraining position shown in FIG. 2 and further showing the locking mechanism including the post-unlocking release button, a locking pin appended to the post-unlocking release button, and a stop formed on one of the two raceways appended to the shell, the stop being engaged by the locking pin to prevent movement of the post in a direction toward the down-out-of-the-way position thereby locking the post in the child-restraining position.

The snow shovel-shaped cross member 44 is integrally appended to the tip 50 of the post 42 as shown in FIGS. 1, 2, and 3. Illustratively, cross member 44 includes a convex top surface 52 and a concave bottom surface 54 arranged to define a foot rest-engaging channel 56. The foot rest 36 includes a convex cross member-receiving surface 58 as shown in FIGS. 2, 4, and 5. The foot rest-engaging channel 56 formed in cross member 44 is arranged to receive the cross member-receiving surface 58 of the foot rest 36 so that the concave bottom surface 54 of the cross member 44 mates against the convex cross member-receiving surface 58 when the T-shaped restraint bar 40 occupies its down-out-of-the-way position as shown in FIGS. 1 and 4. In this position, the foot rest 36 nests in the channel 56 formed in the transverse cross member 44.

When placing a child onto the seat bottom 14 or removing a child from the seat bottom 14, the rotatable T-shaped restraint bar 40 is ideally placed in the down-out-of-the-way position illustrated in FIG. 1 placing the cross member 44 in engagement with the foot rest 36 of the shell 12. This position, having the post 42 and the cross member 44 resting below the plane of the seat bottom 14, provides unobstructed access to the seat bottom 14, resulting in improved convenience for a care giver when seating a child (not shown) on or removing a child from the seat bottom 14.

Once the child (not shown) is placed onto the seat bottom 14 of the seat shell 10, the care giver swings the T-shaped restraint bar 40 upwardly about a pivot axis 39 until the T-shaped restraint bar 40 is automatically locked to the shell 12 so that it is retained in the upright child-restraining position illustrated in FIG. 2. In this position, the post 42 of the T-shaped restraint bar 40 will be disposed in front of and between the legs of a child seated in the seat shell 12, with the tip 50 and the cross member 44 positioned to lie above the seat bottom 14 and in laterally spaced-apart relation to the seat back 20. In the upright child-restraining position, the T-shaped restraint bar 40 provides a restraint to stop the forward motion of a child seated in the seat shell 12 that might otherwise slide forward past the front edge 16 of the seat bottom 14.

To remove a child from the seat shell 12, the care giver simply depresses a release button 46 shown in FIG. 2 and mounted on post 42 in the manner described below to unlock the T-shaped restraint bar 40 so that it is movable relative to shell 12. Next, the care giver swings the T-shaped restraint bar 40 about pivot axis 39 to the down-out-of-the-way position illustrated in FIG. 1 and then rests the cross member 44 against the foot rest 36. Again, with the T-shaped restraint bar 40 in the down-out-of-the-way position, the care giver obtains free and unobstructed access to the seat shell 12, maximizing the ease and convenience of placing the child in or removing the child from the seat shell 12.

Figure 6:
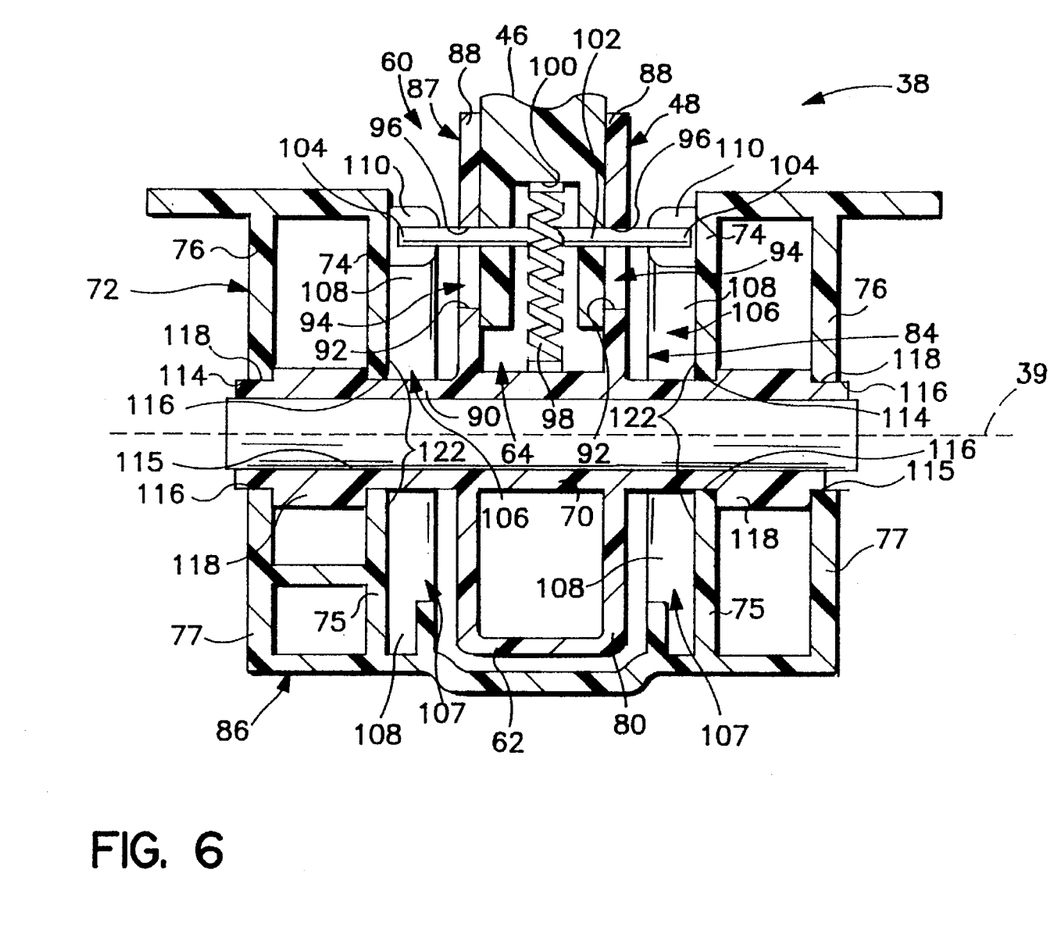
FIG. 6 is a sectional view taken along line 6—6 of FIG. 5 showing the post-unlocking button, the locking pin appended to the post-unlocking button and engaging the spaced-apart pair of stops formed on the raceways, and the horizontal axle appended to the base and rotatably mounted to the shell to permit the T-shaped restraint bar to rotate about an axis defined by the horizontal axle.

The child restraint apparatus 38 is shown in greater detail in FIGS. 3–6. Illustratively, the T-shaped restraint bar 40 is configured as a unitary piece made of a plastics material to define the post 42 and cross member 44 as shown best in FIG. 3. The base 48 of post 42 includes a thin, somewhat cylindrically-shaped hub 62 and a pivot axle 70 that is integrally appended to the hub 62 as shown in FIG. 3. Post 42 is formed to include an internal edge 92 arranged to define a pair of laterally spaced-apart slots 94 extending through the base 48 of the post 42 as shown in FIGS. 3 and 6. Each edge 92 includes a locking pin stop 96 formed to lie at an outermost portion of one of the slots 94 as shown in FIGS. 3 and 6.

The hub 62 houses a locking and unlocking mechanism 60 shown best in FIGS. 4–6. Locking and unlocking mechanism 60 includes the release button 46 and a locking pin 102 appended to the release button 46 as shown in FIGS. 3–6.

The release button 46 and the locking pin 102 are arranged so that the locking pin 102 extends through each of the slots 94 formed in the hub 62 and each of the ends 104 of the locking pin 102 extend through the slots 94 formed in the hub 62 and beyond the exterior side wall 80 of base 48 as shown in FIGS. 3 and 6.

A pivot axle 70 is integrally appended to the hub 62 and is mounted to the shell 12 so that the T-shaped restraint bar 40 and its hub 62 rotate about the axis of rotation 39 when the T-shaped restraint bar 40 is moved by a care giver between the child restraining position shown in FIG. 2 and the down-out-of-the-way position shown in FIG. 1. A bushing 118 is appended to each end of the pivot axle 70 of the hub 62 to prevent axial movement of the hub 62 along the axis of rotation 39 once the T-shaped restraint bar 40 is mounted to the front edge 16 of the seat bottom 14 as described below.

An axle mount 72 and a hub cover 86 cooperate to mount the T-shaped restraint bar 40 to the front edge 16 of the seat bottom 14 for rotation about axis of rotation 39, as shown best in FIGS. 3 and 6. The hub cover 86 includes two interior hub-receiving walls 75 and two exterior hub-receiving walls 77. The hub-receiving walls 75, 77 include edges 115 that are arranged to define semicircular notches 117.

The axle mount 72 is integrally appended to the shell 12 and includes two interior hub-receiving walls 74 and two exterior hub-receiving walls 76 as shown best in FIG. 6. The interior hub-receiving walls 74 are arranged to define a hollow 84 sized to receive the hub 62 of the T-shaped restraint bar 40. The hub-receiving walls 74, 76 include edges 114 that are arranged to define semicircular notches 119. The hub-receiving walls 75, 77 of the hub cover 86 are arranged to mate against hub-receiving walls 74, 76 of the axle mount 72 so that the notches 117, 119 are aligned and the edges 114, 115 cooperate to define circular apertures 116.

The pivot axle 70 is rotatably received in the apertures 116 and is arranged so that the bushings 118 are positioned to lie between interior hub-receiving walls 74, 75 and exterior hub-receiving walls 76, 77, as shown best in FIG. 6. Once the pivot axle 70 is received by the axle mount 72 and the hub cover 86 is placed into engagement with the pivot axle 70 and the axle mount 72, the hub cover 86 is fastened to the axle mount 72 by threaded fastening devices (not shown). Though threaded fastening devices are the preferred method for fastening the hub cover 86 to the axle mount 72, any other suitable fastening method including gluing and riveting are within the scope of the invention as presently perceived.

The axle mount 72 and the hub cover 86 are each formed to include a pair of spaced-apart curved raceways 106, 107 as shown best in FIGS. 3 and 6. The raceways 106, 107 are integrally appended to the interior hub-receiving walls 74, 75 and are arranged to lie on the surfaces 122 adjacent to the hub 62. The raceways 106 that are appended to the axle mount 72 include tops 108, ends 124, and stops 110. The raceways 107 that are appended to the hub cover 86 include tops 108 and ends 126, 128. The ends 126 of the raceways 107 that are appended to the hub cover 86 are arranged to mate against the ends 124 of the raceways 106 that are appended to the axle mount 72 so that the tops 108 present a smooth continuous surface where the hub cover 86 meets the axle mount 72.

Referring now to FIGS. 4 and 5, the base 48 is formed to include an internal tubular button container 87 as shown in FIGS. 4–6. Button container 87 includes a cylindrical side wall 88 integrally appended to the wall 80 and a bottom wall 90 integrally appended to the side wall 88. The side wall 88 and the bottom wall 90 are arranged to define a chamber 64 in tubular button container 87. A portion of side wall 88 is coincident with wall 80 so that the walls 80, 88 both include the edges 92 that are configured to define the slots 94. The chamber 64 is generally cylindrical and extends radially outwardly from the axis of rotation 39 of the hub 62.

The release button 46 is mounted for sliding movement in the chamber 64 formed in the button container 87 and is urged radially outwardly by a compression spring 98 also situated in the button container 87. The spring 98 is positioned inside the chamber 64 as shown, for example, in FIGS. 4–6, to engage both the bottom wall 90 of the chamber 64 and an opposing bottom surface 100 of the release button 46. The locking pin 102 is fixed to the release button 46 to move therewith and is arranged so that the opposite ends 104 of the locking pin 102 extend through the slots 94 of the side wall 88 of the chamber 64. The stops 96 on the edges 92 that define the slots 94 engage the opposite ends 104 of locking pin 102 when the locking and unlocking mechanism 60 is in the locked position as shown in FIGS. 5 and 6 to limit the movement of the release button 46 radially outwardly from the axis 39, thus retaining the release button 46 in the chamber 64.

When the post 42 is not locked into the child-restraining position, the opposite ends 104 of the locking pin 102 engage the tops 108 of the raceways 106, 107. As the T-shaped restraint bar 40 swings between the child-restraining position and the down-out-of-the-way position, the hub 62 rotates about the axis 39 and the opposite ends 104 of the locking pin 102 slide along the tops 108 of the raceways 106, 107. When the post 42 is locked into the child-restraining position, the opposite ends 104 of the locking pin 102 engage the stops 110 of the raceways 106. This engagement precludes rotation of the post 42 in the downward direction 112 toward the down-out-of-the-way position.

When the T-shaped restraint bar 40 is in the child restraining position of FIGS. 2, 5, and 6, the release button 46 is in the locking position. The opposite ends 104 of the locking pin 102 engage the stops 110 formed on the raceways 106 to prevent the T-shaped restraint bar 40 from swinging in the downward direction 112, shown best in FIGS. 5 and 6. The opposite ends 104 of the locking pin 102 also engage the stops 96 formed by the edges 92 of the walls 88 of the chamber 64 limiting the outward movement of the release button 46 and preventing the escape of the release button 46 from the chamber 64.

If the care giver wishes to move the T-shaped restraint bar 40 from the child-restraining position shown in FIGS. 2 and 5 to the down-out-of-the-way position shown in FIGS. 1 and 4, the care giver depresses the release button 46 to move the locking pin 102 radially inwardly toward the axis of rotation 39 so that the opposite ends 104 of the locking pin 102 disengage the stops 110 of the raceways 106. Once the opposite ends 104 of the locking pin 102 disengage the stops 110, the T-shaped restraint bar 40 is freely rotatable between the child-restraining position and the down-out-of-the-way position.

If the care giver were to release the release button 46 without moving the T-shaped restraint bar 40 away from the child-restraining position, the spring 98 would urge the release button 46 and the locking pin 102 radially outwardly so that the opposite ends 104 of the locking pin 102 would once again engage the stops 110, locking the T-shaped restraint bar 40 in the child-restraining position. If instead, the care giver rotates the post 42 away from the child-restraining position and then releases the release button 46, the opposite ends 104 of the locking pin 102 will ride freely along the top surfaces 108 of the raceways 106, 107 and the T-shaped restraint bar 40 will swing freely to any position between the child-restraining position and the down-out-of-the-way position.

When the care giver wishes to move the post 42 from the down-out-of-the-way position to the child-restraining position, the care giver swings the post 42 toward the child-restraining position. The opposite ends 104 of the locking pin 102 will ride along the top surfaces 108 of the raceways 106, 107 following path 120 of FIG. 4.

When the opposite ends 104 of the locking pin 102 travel past the stops 110 of the raceways 106, the spring 98 urges the release button 46 and the locking pin 102 carried on the release button 46 radially outwardly away from the axis of rotation 39 of the hub 62, thereby bringing the opposite ends 104 of the locking pin 102 into engagement with the stops 110. Further rotation of the T-shaped restraint bar 40 in an upward direction 68 away from the down-out-of-the-way position is prevented by the engagement of a top wall 66 of the post 42 with a stop 67 appended to the front edge 16 of the seat bottom 14. Rotation of the T-shaped restraint bar 40 toward the down-out-of-the-way position is prevented by the engagement of the opposite ends 104 of the locking pin 102 with the stops 110 of the raceways 106, 107, thus locking the post 42 into the child-restraining position.

Although the invention has been described in detail with reference to a preferred embodiment, variations and modifications exist within the scope and spirit of the invention as described and defined in the following claims.

I claim:

1. A child seat comprising
 a shell formed to include a seat bottom having a front edge and a back edge, and a seat back extending upwardly from the back edge,
 a post including a base and a tip, the base being rotatably mounted to the shell and arranged so that the tip swings between a down-out-of-the-way position below the seat bottom and a child-restraining position above the seat bottom, and
 locking means coupling the base and the shell for locking the post to the shell when the post swings to the child-restraining position so that the tip is locked in the child-restraining position, the locking means including a release button coupled to the post for releasing the post from the shell when the release button is moved radially relative to the axis of rotation of the base to a release position.

2. The child seat of claim 1, wherein the base is rotatably mounted to the seat bottom.

3. The child seat of claim 2, wherein the base is rotatably mounted to the front edge of the seat bottom.

4. The child seat of claim 1, wherein the shell further includes a foot rest appended to the shell and positioned to lie below the front edge, the foot rest being arranged to engage the tip upon movement of the post to the down-out-of-the-way-position.

5. The child seat of claim 4, wherein the post further includes an elongated transverse cross member appended to the tip and arranged to lie in perpendicular relation to the post.

6. The child seat of claim 4, wherein the base is mounted to the front edge and the child-restraining position is a position with the tip above the seat bottom opposing the seat back.

7. The child seat of claim 1, wherein the post further includes an elongated transverse cross member appended to the tip and arranged to lie in perpendicular relation to the post.

8. The child seat of claim 7, further comprising a button positioned to lie in the base of the post and coupled to the locking means for movement to an activated position to unlock the post from the shell so that the tip can swing between the down-out-of-the-way position and the child-restraining position.

9. The child seat of claim 7, wherein the cross member is above the seat bottom opposing the seat back when the post is in the child-restraining position and the cross member is below the front edge when the post is in the down-out-of-the-way position.

10. The child seat of claim 9, wherein the base is rotatably mounted to the front edge of the seat bottom.

11. The child seat of claim 1, wherein the tip is above the seat bottom opposing the seat back when the post is in the child-restraining position.

12. The child seat of claim 11, wherein the tip is below the front edge when the post is in the down-out-of-the-way position.

13. A child seat comprising a shell formed to include a seat bottom having a front edge and a back edge, a seat back extending upwardly from the back edge, and a foot rest appended to the shell and positioned to lie below the front edge, a post including a base and a tip, the base being rotatably mounted to the shell and arranged so that the tip swings between a down-out-of-the-way position below the seat bottom and a child-restraining position above the seat bottom, the foot rest being arranged to engage the tip upon movement of the post to the down-out-of-the-way-position, and an elongated transverse cross member appended to the tip and arranged to lie in perpendicular relation to the post, the cross member having a concave bottom surface defining an elongated channel arranged so that the foot rest nests in the channel when the post is in the down-out-of-the-way position.

14. A child seat comprising a shell formed to include a seat back and a seat bottom below the seat back having a front edge, restraining means appended to the shell for preventing a child on the seat bottom from moving away from the seat back and past the front edge when the restraining means is in a child-restraining position above the seat bottom, the restraining means being mounted to swing about a pivot axis between a down-out-of-the-way position below the seat bottom and the child-restraining position above the seat bottom, and locking means coupling the restraining means and the shell for locking the restraining means to the shell when the restraining means is in the child-restraining position, the locking means including a release button coupled to the restraining means for releasing the restraining means from the shell when the release button is moved radially relative to the pivot axis of the restraining means to a release position.

15. The child seat of claim 14, wherein the cross means is above the seat bottom opposing the seat back when the restraining means is in the child-restraining position.

16. The child seat of claim 14, wherein the restraining means includes cross means for restraining a child at a plurality of transverse points opposite the seat back, the cross means being appended to the restraining means.

17. The child seat of claim 16, wherein the shell further includes an exterior surface below the front edge and the cross means includes nesting means for mating the cross means against the exterior surface when the restraining means is in the down-out-of-the-way position.

18. The child seat of claim 14, wherein the restraining means is appended to the seat bottom.

19. The child seat of claim 18, wherein the restraining means is appended to the front edge of the seat bottom.

20. The child seat of claim 14, wherein the restraining means is above the seat bottom opposing the seat back when the restraining means is in the child-restraining position.

21. The child seat of claim 20, wherein the shell further includes an exterior surface below the front edge and the restraining means engages the exterior surface when the restraining means is in the down-out-of-the-way position.

22. A child seat comprising a shell formed to include a seat back, a seat bottom below the seat back, the seat bottom having a front edge, and an exterior surface below the front edge, and restraining means appended to the shell for preventing a child on the seat bottom from moving away from the seat back and past the front edge when the restraining means is in a child-restraining position above the seat bottom, the restraining means being mounted to swing between a down-out-of-the-way position below the seat bottom and the child-restraining position above the seat bottom, the restraining means including cross means for restraining a child at a plurality of transverse points opposite the seat back, the cross means having nesting means for mating against the exterior surface when the restraining means is in the down-out-of-the-way position, a portion of the exterior surface of the shell defining a foot rest including a convex cross means-receiving surface, the nesting means mating against the cross means-receiving surface when the restraining means is in the down-out-of-the-way position.

23. The child seat of claim 22, wherein the restraining means includes locking means for locking the restraining means in the child-restraining position.

24. The child seat of claim 23, wherein the restraining means further includes button means for releasing the locking means from the child-restraining position.

25. The child seat of claim 24, wherein the button means is positioned to lie adjacent the front edge of the seat bottom when the restraining means is in the child-restraining position.

26. A child seat comprising a shell formed to include a seat back, a seat bottom below the seat back, the seat bottom having a front edge, and an exterior surface below the front edge defining a foot rest having a convex cross means-receiving surface, restraining means appended to the front edge of the seat bottom for preventing a child on the seat bottom from moving away from the seat back and past the front edge when the restraining means is in a child-restraining position above the seat bottom, the restraining means being mounted to swing between a down-out-of-the-way position below the seat bottom and the child-restraining position above the seat bottom, the restraining means including cross means for restraining a child at a plurality of transverse points opposite the seat back, the cross means being arranged to lie above the seat bottom opposing the seat back when the restraining means is in the child-restraining position, the cross means including nesting means for mating against the cross means-receiving surface when the restraining means is in the down-out-of-the-way position.

27. A child seat comprising a shell formed to include a seat bottom having a front edge and a back edge, a T-shaped bar including a post having a base and a tip, and an elongated transverse cross member appended to the tip and arranged to lie in perpendicular relation to the post, the base being mounted to the shell to pivot about a pivot axis and the cross member being spaced apart from the pivot axis to overlie legs of a child seated on the seat bottom so that the cross member swings between a child-restraining position above the seat bottom and a down-out-of-the-way position below the seat bottom, a foot rest, and means for supporting the foot rest below the seat bottom so that the cross member engages the foot rest to limit further downward pivoting movement when the cross member is in the down-out-of-the-way position.

28. The child seat of claim 27, wherein the supporting means includes a foot rest-support leg extending below and in front of the front edge.

29. The child seat of claim 28, wherein the foot rest-support leg and the foot rest are integrally appended to the shell.

30. The child seat of claim 27, wherein the base is rotatably mounted to the seat bottom.

31. The child seat of claim 30, wherein the base is rotatably mounted to the front edge of the seat bottom.

32. A child seat comprising a shell formed to include a seat bottom having a front edge and a back edge, a T-shaped bar including a post having a base and a tip, the T-shaped bar further including an elongated transverse cross member appended to the tip and arranged to lie in perpendicular relation to the post, the base being rotatably mounted to the shell and arranged so that the cross member swings between a child-restraining position above the seat bottom and a down-out-of-the-way position below the seat bottom, a foot rest, and means for supporting the foot rest below the seat bottom so that the cross member engages the foot rest to limit further downward pivoting movement when the cross member is in the down-out-of-the-way position, the cross member having a concave bottom surface defining an elongated snow shovel-shaped channel.

33. The child seat of claim 32, wherein the foot rest includes an elongated convex surface defining a cross member-receiving surface.

34. The child seat of claim 33, wherein the cross member-receiving surface is arranged to mate against the bottom surface of the cross member when the post is in the down-out-of-the-way position.

35. A child seat comprising a shell formed to include a seat bottom having a front edge, a post including a base and a tip, the base being rotatably mounted to the shell and arranged so that the tip swings between a down-out-of-the-way position below the seat bottom and a child-restraining position above the seat bottom, and a locking pin mounted to the base for radial movement relative to the axis of rotation of the base to arrest rotation of the base when the post is in the child-restraining position.

36. The child seat of claim 35, wherein the base includes a hub fixed to the post, the hub is rotatably mounted to the shell and arranged to rotate about the axis of rotation, and the hub has a side wall arranged to define a chamber extending radially outwardly from the axis of rotation.

37. The child seat of claim 35, wherein a raceway is appended to the shell adjacent to the base, the raceway having a top and a stop, and the locking pin is arranged to engage the top of the raceway when the post is not in the child-restraining position.

38. The child seat of claim 35, wherein a raceway is appended to the shell and is formed to include a top and a stop and the locking pin is arranged to engage the stop when the post is in the child-restraining position.

39. The child seat of claim 38, wherein the locking pin is arranged to engage the top of the raceway when the post is not in the child-restraining position.

40. The child seat of claim 35, wherein the locking pin is fixed to a button coupled to the base and the button is arranged to reciprocate between a post-locking position and post-releasing position.

41. The child seat of claim 40, wherein the base rotates about an axis of rotation, the base includes a side wall arranged to define a chamber extending radially outwardly from the axis of rotation, and the button is positioned to lie in the chamber.

42. A child seat comprising a shell formed to include a seat bottom having a front edge, and a foot rest appended to the shell and positioned to lie below the front edge, a post including a base and a tip, the base being rotatably mounted to the front edge of the seat bottom and arranged so that the tip swings between a down-out-of-the-way position below the seat bottom and a child-restraining position above the seat bottom, the foot rest engaging the tip upon movement of the post to the down-out-of-the-way-position, and a locking pin mounted to the base and engaging the shell to arrest rotation of the base when the post is in the child-restraining position, the locking pin being fixed to a button coupled to the base, the button being arranged to reciprocate between a post-locking position and a post-releasing position, the post further including an elongated transverse cross member appended to the tip and arranged to lie in perpendicular relation to the post, the cross member having a concave bottom surface defining an elongated channel arranged so that the foot rest nests in the channel when the post is in the down-out-of-the-way position.

43. A child seat comprising a shell formed to include a seat bottom having a front edge, a post including a base and a tip, the base being rotatably mounted to the shell and arranged so that the tip swings between a down-out-of-the-way position below the seat bottom and a child-restraining position above the seat bottom, a locking pin mounted to the base and engaging the shell to arrest rotation of the base when the post is in the child-restraining position, a raceway appended to the shell adjacent to the base, the raceway having a top and a stop, the locking pin engaging the top of the raceway when the post is not in the child-restraining position, and a spring mounted in the base and arranged to bias the locking pin to a post-locking position, the locking pin engaging the stop when the post is in the child-restraining position and the locking pin is in the post-locking position.

44. A child seat comprising a shell formed to include a seat bottom having a front edge, a post including a base and a tip, the base being rotatably mounted to the shell and arranged so that the tip swings between a down-out-of-the-way position below the seat bottom and a child-restraining position above the seat bottom, the base including a hub fixed to the post, the hub being rotatably mounted to the shell and arranged to rotate about an axis of rotation, the hub having a side wall defining a chamber extending radially outwardly from the axis of rotation, a locking pin mounted to the base and engaging the shell to arrest rotation of the base when the post is in the child-restraining position, and a button positioned to lie in the chamber, the locking pin being fixed to the button, the side wall of the chamber having an edge defining a pin-receiving slot, and the locking pin extending through the slot and beyond the side wall.

45. The child seat of claim 44, wherein a raceway having a top and a stop is appended to the shell adjacent the base and the locking pin is arranged to engage the stop when the post is in the child-restraining position and the top when the post is not in the child-restraining position.

46. A child seat comprising a shell formed to include a seat bottom having a back edge and first and second side edges, a first side wall extending upwardly from the first side edge and extending forwardly from the back edge, and a second side wall extending upwardly from the second side edge and extending forwardly from the back edge, the first and second side walls cooperating to laterally restrain a child seated on the seat bottom, a post including a base and a tip, the base being mounted to the shell for rotation about an axis of rotation, the tip being spaced-apart from the axis of rotation so that the tip swings between a down-out-of-the-way position below the seat bottom and a child-restraining position above the seat bottom, and a transverse cross bar mounted to the tip and overlying the legs of the child seated on the seat bottom, the cross bar being positioned to lie between the first and second side walls when the tip is in the child-restraining position.

47. The child seat of claim 46, wherein the cross bar includes first and second ends spaced apart from the first and second side walls of the shell so that the cross bar is positioned to lie between the side walls of the shell without engaging the side walls of the shell when the post is in the child-restraining position.

48. The child seat of claim 47, wherein the seat bottom further includes a back edge, the shell further includes a seat back appended to the back edge and extending upwardly therefrom, and the first and second ends of the cross bar are spaced apart from the seat back.

49. The child seat of claim 48, wherein the cross bar extends in a direction generally parallel to the seat back.

50. The child seat of claim 46, wherein each side wall is formed to include a top wall having a tray-receiving slot and further comprising a tray mounted on the side walls and overlying the seat bottom, the cross bar being positioned to lie beneath the tray-receiving slots when the post is in the child-restraining position.

51. The child seat of claim 50, further comprising locking means coupled to the shell and movable to a locking position for locking the post relative to the shell so that the post is stationary relative to the shell when the locking means is in the locking position, the cross bar being positioned to lie above the locking means.

52. A child seat comprising a shell formed to include a seat bottom having a front, a back, first and second side edges, a first side arm extending upwardly from the first side edge, and a second side arm extending upwardly from the second side edge, each side arm including a top wall formed to include tray-receiving slots, a post including a base and a tip, the base being mounted to the shell for rotation about an axis of rotation, the tip being spaced apart from the axis of rotation so that the tip swings between a down-out-of-the-way position below the seat bottom and a child-restraining position above the seat bottom, and a transverse cross bar mounted to the tip and positioned to lie beneath the tray-receiving slots when the post is in the child-restraining position.

53. The child seat of claim 52, further comprising locking means coupled to the shell and movable to a locking position for locking the post relative to the shell so that the post is stationary relative to the shell when the locking means is in the locking position, the locking means being positioned to lie beneath the cross bar when the post is in the child-restraining position.

54. The child seat of claim 53, further comprising a release button coupled to the post and coupled to the locking means for moving the locking means away from the locking position so that the post can swing between the child-restraining position and the down-out-of-the-way position.

55. A child seat comprising a shell formed to include a seat bottom, a post including a base and a tip, the base being mounted to the shell for rotation about an axis of rotation, the tip being spaced apart from the axis of rotation so that the tip swings between a down-out-of-the-way position below the seat bottom and a child-restraining position above the seat bottom, locking means mounted to the post for locking the post to the shell so that the post is stationary relative to the shell, and a release button mounted to the post and movable to a release position actuating the locking means for releasing the post from the shell, the button being positioned to lie above the locking means when the post is in the child-restraining position.

56. The child seat of claim 55, wherein the release button is coupled to the front of the post and extends forwardly therefrom when the post is in the child-restraining position.

57. The child seat of claim 55, wherein the release button is positioned to lie beneath a cross bar.

58. The child seat of claim 55, wherein the release button is spaced apart from the tip of the post.

59. The child seat of claim 55, wherein the release button is mounted for reciprocating movement relative to the post in a radial direction relative to the axis of rotation of the base.

60. The child seat of claim 59, wherein the locking means includes a pin appended to the button, the pin engaging the shell when the post is locked to the shell.

61. The child seat of claim 59, further comprising a spring engaging the button and engaging the post to yieldably bias the button outwardly from the axis of rotation of the base.

* * * * *